(12) United States Patent
Okumura et al.

(10) Patent No.: US 11,130,232 B2
(45) Date of Patent: Sep. 28, 2021

(54) ROBOT SYSTEM

(71) Applicant: NIDEC SANKYO CORPORATION, Nagano (JP)

(72) Inventors: Hirokatsu Okumura, Nagano (JP); Jun Otsuji, Nagano (JP); Tetsuya Inomata, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 353 days.

(21) Appl. No.: 16/223,891

(22) Filed: Dec. 18, 2018

(65) Prior Publication Data
US 2019/0184557 A1 Jun. 20, 2019

(30) Foreign Application Priority Data
Dec. 18, 2017 (JP) .............................. JP2017-241615

(51) Int. Cl.
B25J 9/16 (2006.01)
B25J 9/00 (2006.01)
B25J 13/06 (2006.01)
B25J 9/08 (2006.01)

(52) U.S. Cl.
CPC ........... B25J 9/1656 (2013.01); B25J 9/0009 (2013.01); B25J 9/08 (2013.01); B25J 9/1674 (2013.01); B25J 13/06 (2013.01); G05B 2219/40009 (2013.01)

(58) Field of Classification Search
CPC . B25J 9/08; B25J 9/1617; B25J 9/1674; B25J 9/1692; B25J 9/0009; B25J 9/1656; B25J 13/06; G05B 2219/40009
See application file for complete search history.

(56) References Cited

U.S. PATENT DOCUMENTS

2019/0121323 A1* 4/2019 Tokushima ............ B25J 13/088

FOREIGN PATENT DOCUMENTS

| JP | 2001242922 A | * | 9/2001 |
| JP | 2001242922 A |   | 9/2001 |
| JP | 2004148433 A |   | 5/2004 |
| JP | 2013056378 A |   | 3/2013 |
| JP | 2016137526 A |   | 8/2016 |

* cited by examiner

Primary Examiner — Spencer D Patton
(74) Attorney, Agent, or Firm — Cantor Colburn LLP

(57) ABSTRACT

A robot system may include a robot controller; and a target robot. The target robot may include a first memory to store device specific data including individual identification data; and an individual difference parameter unique to the target robot. The robot controller may include a second memory structured to store the individual identification data and the individual difference parameter of the target robot connected to the robot controller; and a controller to control the target robot on the basis of model configuration information the individual difference parameter stored in the second memory. The controller may check the individual identification data read from the first memory unit against the individual identification data stored in the second memory unit and, in accordance with a checking result, update the individual difference parameter stored in the second memory unit with the individual difference parameter read from the first memory unit.

10 Claims, 5 Drawing Sheets

ROBOT SYSTEM

CROSS REFERENCE TO RELATED APPLICATIONS

The present application claims priority under 35 U.S.C. § 119 to Japanese Application No. 2017-241615 filed Dec. 18, 2017, the entire content of which is incorporated herein by reference.

TECHNICAL FIELD

At least an embodiment of the present invention relates to a robot system that includes a manipulator as a robot body and a robot controller for controlling this manipulator.

BACKGROUND

In general, a robot system is configured to include: a manipulator, that is, a robot body; and a robot controller that controls the manipulator. The manipulator includes: an arm and a hand that are coupled to each other; and a motor that drives a coupled portion of those arm and hand. In order to control rotation of each of the motors in the manipulator by the robot controller, an encoder is attached to each of the motors to detect a rotary position thereof, and rotary position information acquired by the encoder is transmitted to the robot controller as needed. In some cases, the robot system is provided with an auxiliary component such as an aligner that changes an attitude of a workpiece as a target of processing by the manipulator. The auxiliary component is also a control target of the robot controller.

In the manipulator as the robot body, numbers and dimensions of the arm and the hand, a connection relationship between those arm and hand, a specification of each of the motors mounted therein differ by robot models. Accordingly, the robot controller is prepared for each of the robot models. Furthermore, even among the robots of the same model, individual differences of the manipulators are inevitable. Thus, when controlling such a manipulator, the robot controller has to control the manipulator in accordance with the individual difference thereof. An example of the individual difference is an offset value from a position of an origin. The position of the origin is set for each of the manipulators as a reference attitude for an operation thereof. However, due to attachment variations of the motors and the encoders, and the like, a value of rotary position data presented by the encoder of each of the motors at the position of the origin differs by units of the manipulators. The same applies to the auxiliary component having a motor. In view of the above, the individual difference is actually measured upon completion of assembly of each of the robots, or the like. The individual difference is then stored in a memory unit of the robot controller. For this reason, the manipulator cannot easily be replaced with another manipulator of the same model, and the other manipulator of the same model cannot easily be connected to the robot controller even when the manipulators of the same model are set as control targets of the robot controller.

In Japanese Unexamined Patent Application Publication No. 2001-242922, as an attempt to allow replacement of the robot body that is connected to the robot controller, a robot system that can control the robot body by the robot controller even when a built-in board in the robot body is replaced is disclosed. In Japanese Unexamined Patent Application Publication No. 2004-148433, in order to automate work of updating data that is associated with a robot mechanism or a mechanism unit after replacement thereof, a technique of rewriting data in the robot controller by data read from the robot mechanism or the mechanism unit upon detection of the replacement is disclosed. Japanese Unexamined Patent Application Publication No. 2016-137526 relates to information on sensors provided in a robot and discloses a technique of reading the information into the robot controller from the robot body after replacement of the robot body. Japanese Unexamined Patent Application Publication No. 2013-56738 discloses a technique of using replacement memory to appropriately and easily migrate robot operation data from the robot controller that has been used so far to a new robot controller.

The replacement of the robot controller that is connected to the robot body of a certain model with another robot controller for the same model, or the replacement of the robot body that is connected to the robot controller with the robot body within the same model range is nothing less than a change of a combination of the robot controller and the robot body within the same model range. Thus, the techniques disclosed in Japanese Unexamined Patent Application Publication No. 2001-242922, 2004-148433, 2016-137526, and 2013-56738, each of which allows changing of the robot body connected to the robot controller, are not necessarily optimized techniques from a perspective of the change of the combination of the robot controller and the robot body within the same model range. In the technique disclosed in Japanese Unexamined Patent Application Publication No. 2013-56738, when the robot controller is changed, a backup of a parameter relevant to the individual difference has to be created, which complicates a procedure.

SUMMARY

At least an embodiment of the present invention provides a robot system capable of facilitating replacement and connection of a robot controller or an auxiliary component to a robot body and minimizing data volume held on the robot body side or the auxiliary component side.

A robot system of at least an embodiment of the present invention is a robot system having a robot controller and a target robot as a target of control by the robot controller. The target robot includes a first memory unit storing device specific data that contains: individual identification data used to identify the target robot; and an individual difference parameter unique to the target robot. The robot controller includes: a second memory unit that stores the individual identification data and the individual difference parameter of the target robot connected to the robot controller; and a control unit that controls the target robot on the basis of model configuration information common to the target robots of the same model and the individual difference parameter stored in the second memory unit. The control unit checks the individual identification data read from the first memory unit against the individual identification data stored in the second memory unit and, in accordance with a checking result, updates the individual difference parameter stored in the second memory unit with the individual difference parameter read from the first memory unit.

According to at least an embodiment of the present invention as described above, in the case where the robot controller that is connected to the target robot is replaced with a robot controller for the same model, the robot controller can control the target robot on the basis of the individual difference parameter stored in the target robot and thus can realize the appropriate control for the target robot.

In the robot system of at least an embodiment of the present invention, the target robot may include a robot body as a manipulator and an auxiliary component. In such a case, each of the robot body and the auxiliary component includes the first memory unit. In the case where only the individual identification data of the auxiliary component read from the first memory unit differs from the individual identification data of the auxiliary component stored in the second memory unit, the control unit may determine that the auxiliary component has been replaced, and may updates only the individual difference parameter of the auxiliary component in the second memory unit. With such a configuration, in the robot system that includes the auxiliary component such as an aligner, appropriate control can be executed even in the case where only the auxiliary component is replaced.

In the robot system of at least an embodiment of the present invention, the device specific data may contain information on the model of the target robot, and, in the case where the information on the model in the device specific data does not match a model as the target of the robot controller, the control unit may disallow a start of the robot system. In this way, failure caused by connecting the robot controller for another model can be prevented.

In the robot system of at least an embodiment of the present invention, the device specific data may contain information on a configuration of the target robot, and, in the case where the information on the configuration in the device specific data does not match a configuration of the target robot of the model as the target of the robot controller, the control unit may disallow the start of the robot system. In this way, in the case where mismatch of the configurations such as improper connection of a wire of a motor in the target robot is present, an operation of the robot system can be prevented.

In the robot system of at least an embodiment of the present invention, as the individual difference parameter, an offset value from a position of an origin may be used. In this way, when the robot controller is replaced, adjustment of the offset value or measurement of the offset value does not have to be newly performed, and the new robot controller can drive the target robot.

In the robot system of at least an embodiment of the present invention, the target robot may include: a motor provided for each shaft; and an encoder that detects a rotary position of the motor, and the first memory unit may be provided in the encoder. In the target robot, the individual difference parameter such as the offset value varies by replacing the motor. However, since the device specific data is stored in the memory unit of the encoder as a part attached to the motor, the device specific data is stored in association with the part to be replaced. Therefore, management of the robot system is facilitated. In this case, the control unit detects replacement of the motor in the target robot on the basis of the device specific data, and disallows the start of the robot system when detecting the replacement of the motor. The replacement of the motor requires new adjustment in the target robot. Thus, by disallowing the start of the robot system upon detection of the replacement of the motor, the operation of the target robot that is insufficiently adjusted can be prevented.

According to at least an embodiment of the present invention, the robot system capable of facilitating the replacement and the connection of the robot controller or the auxiliary component to the robot body and minimizing data volume held on the robot body side or the auxiliary component side is obtained.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
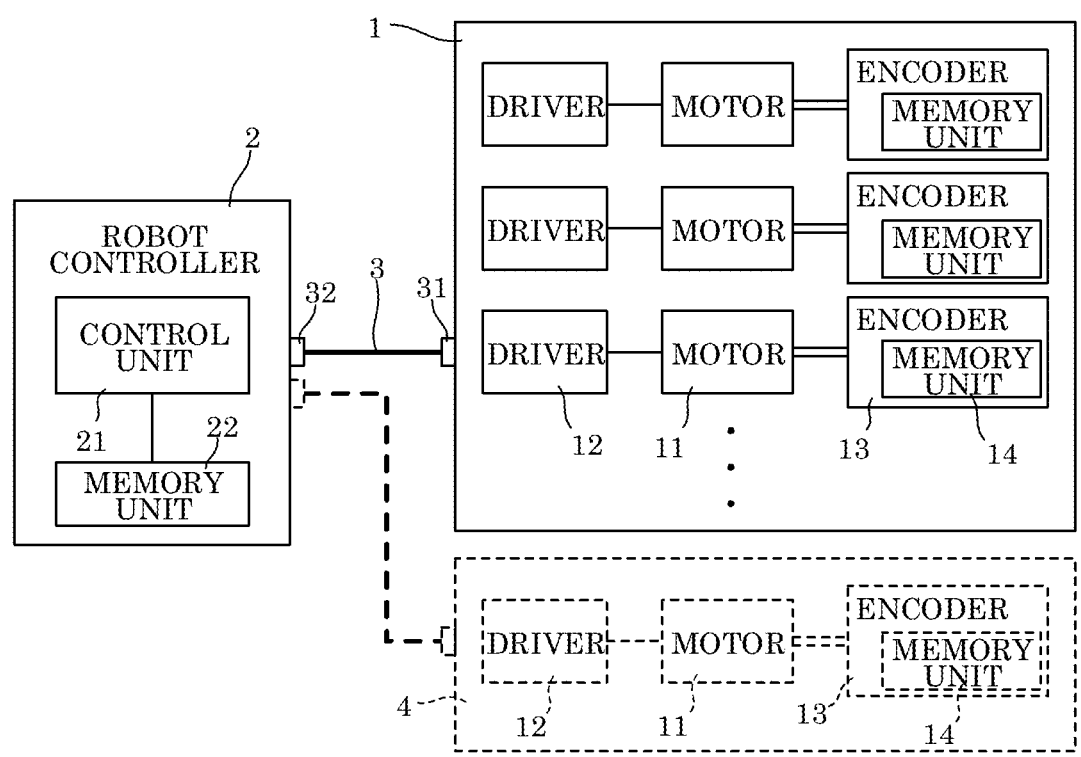
FIG. 1 is a block diagram of a configuration of a robot system in an embodiment of the present invention.

Next, a description will be made on an embodiment of the present invention with reference to the drawings. FIG. 1 shows a robot system in an embodiment of the present invention. This robot system includes: a robot body 1 that is configured as a manipulator; and a robot controller 2 that controls the robot body 1. The robot body 1 and the robot controller 2 are detachably connected to each other by a connection cable 3. A connector 31 for connection with the robot body 1 is attached to one end of the connection cable 3, and a connector 32 for connection with the robot controller 2 is attached to the other end of the connection cable 3. As indicated by a broken line in FIG. 1, the robot system may be provided with an aligner 4, as an auxiliary component, that changes an attitude of a workpiece. In such a case, the aligner 4 is also connected to the robot controller 2 and controlled by the robot controller 2. An auxiliary component other than the aligner 4 may be provided. Components as targets of control by the robot controller 2 will collectively be referred to as a target robot. As an example described herein, the target robot includes the robot body 1 and the aligner 4.

The robot body 1 has plural drive shafts and includes, for each of the drive shafts: a motor 11 that is a servomotor to drive the drive shaft; a driver 12 that controls driving of the motor 11 on the basis of a command from the robot controller 2; and an encoder 13 that is attached to a rotary shaft of the motor 11 and detects a rotary position of the rotary shaft. Although not shown, each of the motors 11 also includes a reduction gear, a pulley, and the like as auxiliary components. Each of the encoders 13 is provided with a non-volatile memory unit 14 that stores an operation parameter of the encoder 13. Each of the memory units 14 is typically formed from electrically erasable programmable read-only memory (EEPROM). In the case where the aligner 4 is provided in the robot system, the aligner 4 is handled as a single-shaft robot, that is, having one each of the motor 11, the driver 12, and the encoder 13. The non-volatile memory unit 14 is also provided in the encoder 13 of the aligner 4.

The robot controller 2 includes: a control unit 21 that generates the command to the motor 11 for each of the shafts on the basis of the rotary position read from the encoder 13 for each of the shafts such that the robot body 1 moves on a predetermined trajectory; and a non-volatile memory unit 22 that stores parameters required for calculation in the control unit 21. The memory unit 22 stores descriptive data on a configuration of the robot such as lengths of an arm and a hand constituting the robot body 1 as the manipulator, a connection relationship between the arm and the hand, and a specification of each of the motors 11, that is, information that can be used commonly for the robots of the same model. The information that is regarded as common to the robots of the same model regardless of individual differences, just as described, will be referred to as model configuration information. The memory unit 22 also stores a parameter for which the individual differences cannot be ignored even among the robots of the same model. An example of such a parameter is an offset value from a position of an origin acquired by each of the encoders 13. In the case where the aligner 4 is provided, the memory unit 22 further stores the offset value relevant to the aligner 4. When controlling the robot body 1 and the aligner 4, the control unit 21 uses the model configuration information and the parameters relevant to the individual differences such as the offset values, both of which are stored in the memory unit 22.

In the robot system of the present embodiment, a robot controller that is connected to the robot body 1 of a certain model can be replaced with another robot controller for the same model. Alternatively, a robot body that is connected to the robot controller 2 can be replaced with another robot body within the same model range. Both of these types of the replacement fall within a range of combinations of the robot body 1 and the robot controller 2 in the same model range, and these types of the replacement will be referred to as "replacement of the robot controller" in the following description. For example, the replacement of the robot controller with a robot controller prepared as a spare part also corresponds to the replacement of the robot controller. In the present embodiment, in order to allow the replacement of the robot controller, device specific data is written in the non-volatile memory unit 14 of each of the encoders 13. At the start of the robot system, the robot controller 2 reads the device specific data from each of the encoders 13. In the case where it is determined that the robot controller has been replaced as a result of reading, the control unit 21 of the robot controller 2 uses the device specific data read from the encoders 13 to execute necessary processing.

Figure 2:
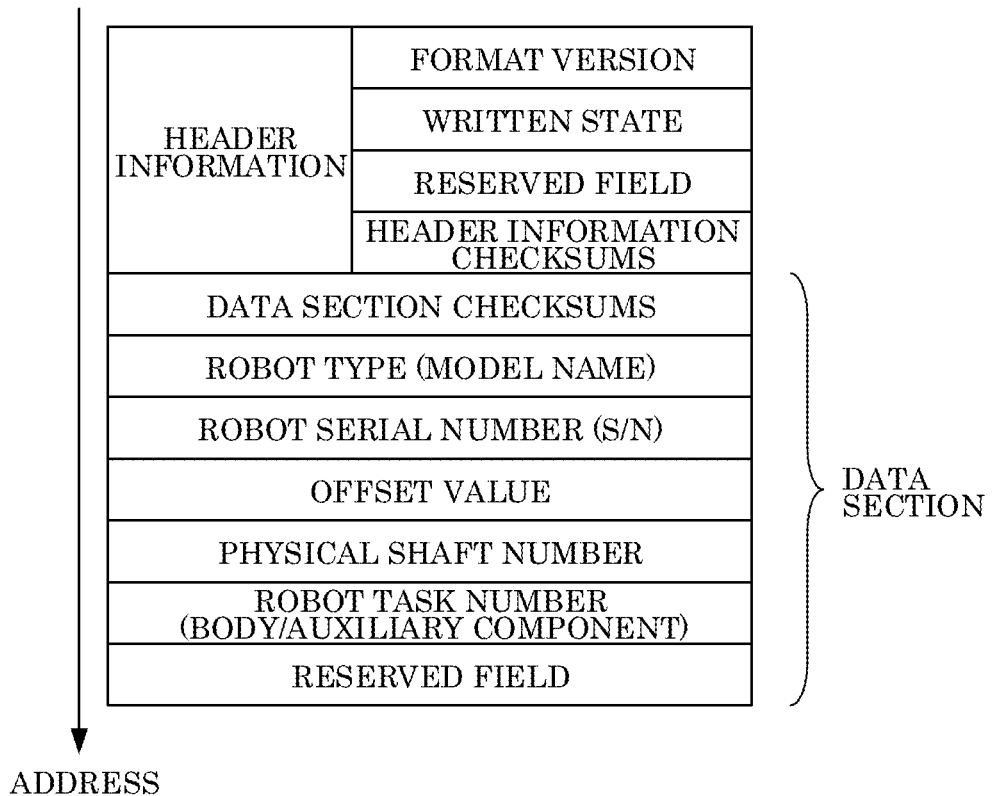
FIG. 2 is a table showing a format of device specific data saved in each encoder.

FIG. 2 shows an exemplary format of the device specific data that is saved in the memory unit 14 of each of the encoders 13. The device specific data is fixed-length data that contains data on a robot type (model), data used to identify the robot body 1 or the aligner 4 as an individual component, and a parameter that possibly varies among the robot bodies 1 or the aligners 4 of the same model as the individual difference (for example, the offset value from the position of the origin). The data used to identify the robot body 1 or the aligner 4 as the individual component will be referred to as individual identification data. In the present embodiment, a serial number is used as the individual identification data. However, another type of data may be used as the individual identification data. Meanwhile, the parameter that possibly varies among the robot bodies 1 or the aligners 4 of the same model as the individual difference will be referred to as an individual difference parameter. As shown in FIG. 2, the device specific data is configured to contain header information and a data section in an order of addresses. The similar device specific data is also stored in the memory unit 14 of the aligner 4. The header information contains a field of a format version that identifies the format of the device specific data, a field of a written state, a reserved field, and a field of checksums for the header information. In the field of the written state, data indicative of whether the device specific data is in an initial state, whether writing of the device specific data is completed, or whether the device specific data is currently written and thus is incomplete is written. The field of the checksums for the header information is a field in which the checksums for the field of the format version, the field of the written state, and the reserved field in the header information are stored.

The data section is configured to contain a field of checksums for the data section in which the checksums for the entire data section are stored, a field of the robot type as data on the robot model, a field of the serial number, a field of the offset value from the position of the origin, a field of a physical shaft number, a field of a robot task number, and a reserved field. In the present embodiment, the individual difference parameter, which is saved as the device specific data in each of the encoders 13, is not the parameter relevant to the entire robot body 1 but is limited to the parameter relevant to the corresponding encoder 13. Accordingly, as the offset value from the position of the origin, an offset value of the rotary position acquired by the encoder 13, which stores the device specific data, at the time when the robot body 1 is at the position of the origin is stored. The individual difference parameter that is stored in the memory unit 14 of the aligner 4 is limited to the individual difference parameter acquired by the encoder 13 of the aligner 4. Under the assumption that the robot body 1 includes the plural drive shafts and the unique physical shaft number is assigned to each of those drive shafts, the field of the physical shaft number indicates the physical shaft relevant to the encoder 13, which stores the device specific data. The robot task number is a number indicative of whether the encoder 13, which stores the device specific data, is provided in the robot body 1 or the aligner 4. In the present embodiment, the same robot types are used for the robot body 1 and the aligner 4, and these robots are distinguished from each other by using the robot task numbers. In the case where the plural auxiliary components are used, the different robot task number is assigned to each type of the auxiliary components. The serial number constitutes the individual identification data, and each of the physical shaft number and the robot task number is the information on the configuration of the target robot.

In general, the encoder 13 is not detached from the motor 11. Thus, when the motor 11 in the robot body 1 or the aligner 4 is replaced, the motor 11 is replaced together with the encoder 13. Accordingly, it can be said that the device specific data stored in the memory unit 14 of the encoder 13 is the data associated with the motor 11. When the motor 11 is replaced, the offset value from the position of the origin varies due to a variation in assembly of the motors 11 at the time. As a result, adjustment work has to be performed to set the offset value again. For this reason, in the present embodiment, while the replacement of the robot controller 2 is allowed, the replacement of the motor 11 itself in the robot body 1 or the aligner 4 is disallowed and thus is considered as an error. For a similar reason, the physical shaft number that is saved in the encoder 13 has to match the physical shaft number of the drive shaft with which the encoder 13 is associated. In addition, all the encoders 13 provided in the same robot body 1 have the same serial numbers in the device specific data. Needless to say, the encoder 13 that is provided in the different robot body 1 has the different serial number in the device specific data. In regard to the aligner 4 that is simultaneously used with the robot body 1, the serial number in the device specific data on the robot body 1 side may be the same as or different from the serial number in the device specific data on the aligner 4 side.

The description has been made on the data configuration of the device specific data by using FIG. 2. As the parameter that is stored in the device specific data and has the individual difference among the robots of the same model, a parameter other than the offset value from the position of the origin may be used, or plural types of parameters may be used. Furthermore, in order to detect the improper replacement or the like, as the information used to identify the robot as the individual component, information other than the robot type and the serial number may be used, or another type of information may be used in addition to the robot type and the serial number.

Next, a description will be made on processing in the robot system that is executed after the robot controller 2 is replaced. In the present embodiment, the robot controller 2 is prepared for each of the robot models as the control targets. Thus, the memory unit 22 of the robot controller 2 stores the data on the robot type, the model configuration information on the dimensions and the specifications that are common to the model, and the individual identification data and the individual difference parameters of the robot body 1 (and further the aligner 4) that is currently connected or has been connected last. Instead of the individual identification data and the individual difference parameters of the robot body 1 (and further the aligner 4) that is currently connected or has been connected last, initial values of the individual identification data and the individual difference parameters may be stored in the memory unit 22. Furthermore, the individual identification data and the individual difference parameters may be able to be reset to the initial values by a command operation in the robot controller 2.

Figure 3:
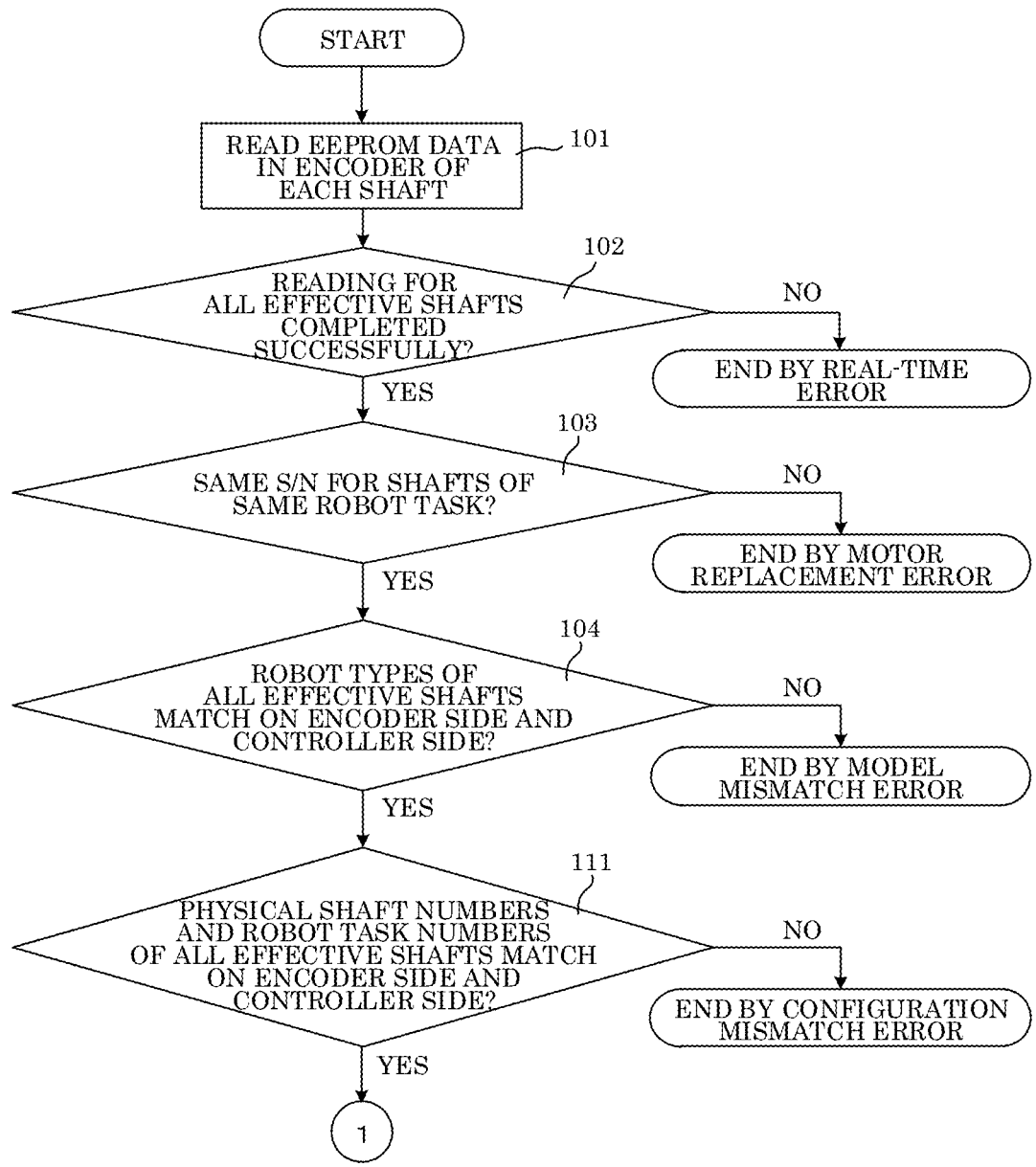
FIG. 3 is a flowchart of an operation of the robot system shown in FIG. 1.
Figure 4:
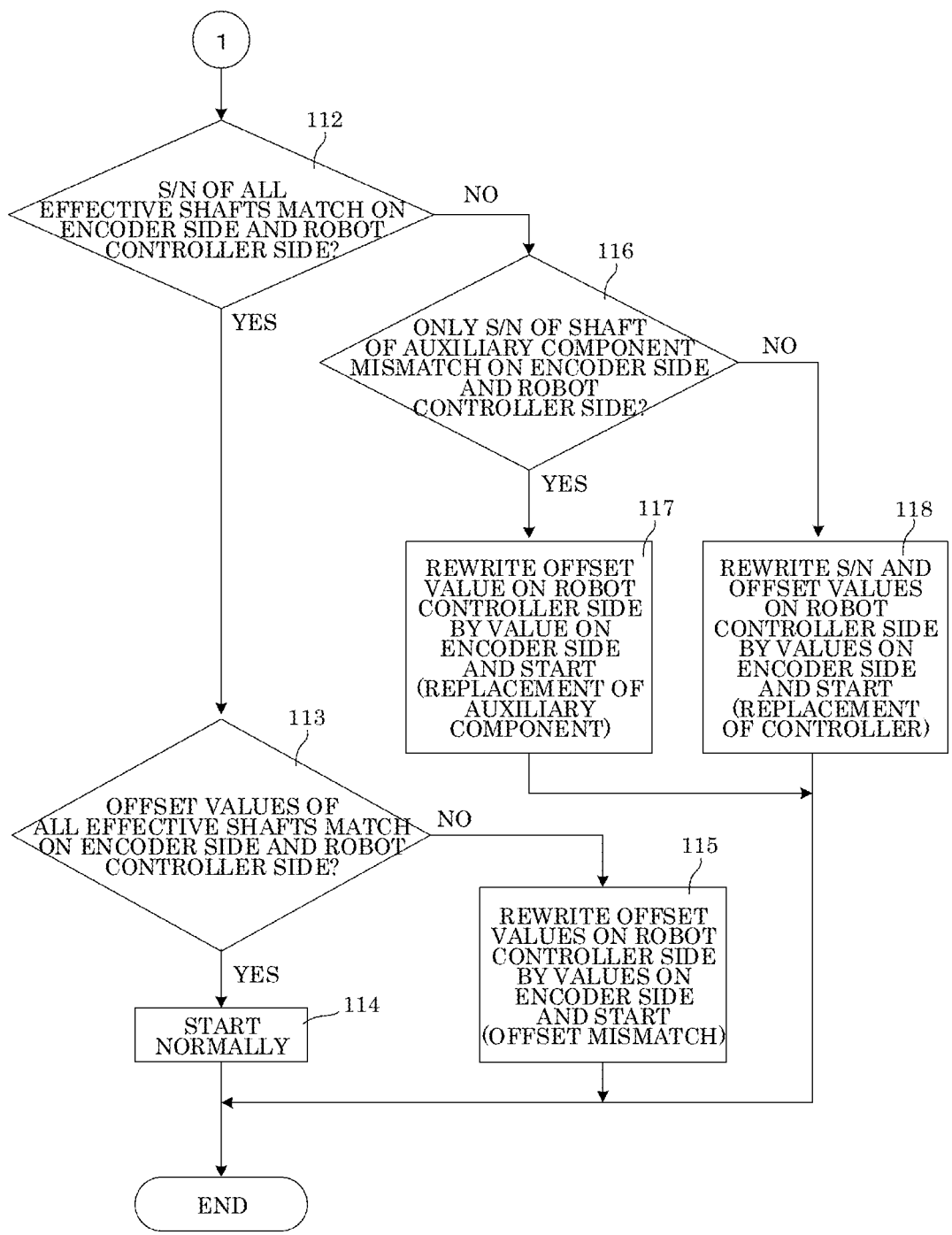
FIG. 4 is a flowchart of the operation of the robot system shown in FIG. 1.

FIG. 3 and FIG. 4 are flowcharts of processing that is executed by the robot system. The processing shown herein is processing to start the robot system by the robot controller 2 when power is turned on, and the like. In the following description, when only the robot body 1 is connected to the robot controller 2, each of the drive shafts of the robot body 1 will be referred to as an effective shaft. When both of the robot body 1 and the aligner 4 are connected to the robot controller 2, each of the drive shafts of the robot body 1 and the aligner 4 will be referred to as the effective shaft. When the power of this robot system is turned on in a state where the robot body 1 is connected and the aligner 4 is further connected upon necessity, in step 101, the control unit 21 of the robot controller 2 reads the device specific data, which is stored in the memory unit (EEPROM) 14 of the encoder 13 of each of the effective shafts, from the encoder 13. Then, in step 102, the control unit 21 of the robot controller 2 determines whether reading of the data for all the effective shafts is successfully finished. If reading is not successfully finished, the control unit 21 determines that a real-time error has occurred, and terminates the operation of the robot system. If reading of the data for all the effective shafts is successfully finished, the control unit 21 determines in step 103 whether the serial numbers are the same in the device specific data of the shafts that have the same robot task numbers in the data read from the encoders 13. If the device specific data that contains the different serial number is present, the presence of such data means that the motor 11 has been replaced. Thus, the control unit 21 determines that a motor replacement error has occurred, and terminates the operation of the robot system.

If the motor replacement error does not occur in step 103, the control unit 21 determines in step 104 whether the robot types (models) read from the encoders 13 of all the effective shafts match the robot types that are saved in advance in the memory unit 22. If the robot types read from the encoders 13 do not match the robot types saved in the memory unit 22, the robot body 1 or the aligner 4 of the model other than the control target of the robot controller 2 is connected to the robot controller 2. Thus, the control unit 21 determines that a model mismatch error occurs, and terminates the operation of the robot system. If the robot types read from the encoders 13 match the robot types saved in the memory unit 22 in step 104, the control unit 21 determines in step 111 whether the physical shaft numbers and the robot task numbers read from the encoders 13 of all the effective shafts match the physical shaft numbers and the robot task numbers that are saved in advance in the memory unit 22. When the robot controller 2 reads the device specific data from the plural encoders 13, the robot controller 2 reads the data one by one from the encoders 13 in a predetermined order. However, at this time, the robot controller 2 possibly reads the data in a different order from the original order due to improper connection of motor wires or the like. In this case, a mismatch of the physical shaft numbers or the robot task numbers occurs. Even in the case where the data is read in parallel from the plural encoders 13, the mismatch of the physical shaft numbers or the robot task numbers occurs when the wires are improperly connected. Thus, if the mismatch of the physical shaft numbers or the robot task numbers occurs, the control unit 21 determines that a configuration mismatch error has occurred, and terminates the operation of the robot system.

In step 111, if the physical shaft numbers and the robot task numbers read from the encoders 13 of all the effective shafts match the physical shaft numbers and the robot task numbers saved in the memory unit 22, the control unit 21 determines in step 112 whether the serial numbers read from the encoders 13 of all the effective shafts match the serial numbers saved in the memory unit 22. Here, the case where the serial numbers read from the encoders 13 match the serial numbers saved in the memory unit 22 is the case where neither the robot controller 2 nor the aligner 4 is replaced. Thus, next in step 113, the control unit 21 determines whether the offset values of all the effective shafts that are saved in the memory unit 22 match the offset values read from the encoders 13. If the offset values of all the effective shafts that are saved in the memory unit 22 match the offset values read from the encoders 13, it can be determined that the offset values, that is, the individual difference parameters saved in the memory unit 22 of the robot controller 2 are appropriate. Thus, in step 114, the control unit 21 normally starts the robot system and terminates the processing to start the robot system.

The case where the offset values that are saved in advance in the memory unit 22 of the robot controller 2 do not match the offset values read from the encoders 13 in step 113 is the case where readjustment of the motor 11, and the like are performed but results thereof are not reflected to the robot controller 2 side. Thus, in step 115, the control unit 21 rewrites the offset values saved in the memory unit 22 by the offset values read from the encoders 13, and then terminates the processing. Thereafter, the power is turned on again. In such a case, the processing from step 101 to step 112 is executed, which then proceeds to step 113 and step 114. Thus, the robot system is normally started on the basis of the rewritten offset values.

The case where the serial numbers read from the encoders 13 do not match the serial numbers saved in the memory unit 22 in step 112 is the case where the robot controller 2 has been replaced or the aligner 4 has been replaced. Accordingly, if the mismatch of the serial numbers occurs in step 112, the control unit 21 determines in step 116 whether the mismatch of the serial numbers only occurs to the shaft of the aligner 4 that is identified from the robot task number. If the mismatch of the serial numbers only occurs to the shaft of the aligner 4, it can be determined that the aligner 4 has been replaced. Thus, in step 117, the control unit 21 rewrites the offset value of the shaft of the aligner 4 stored in the memory unit 22 by the offset value read from the encoder 13, and then terminates the processing. Thereafter, in the case where the power is turned on again, the robot system is normally started on the basis of the rewritten offset value.

If the mismatch of the serial numbers occurs to the shafts in addition to the shaft of the aligner 4 in step 116, it can be determined that the robot controller 2 has been replaced. Thus, in step 118, the control unit 21 rewrites the serial numbers and the offset values of all the effective shafts that are stored in the memory unit 22 by the serial numbers and the offset values read from the encoders 13, and then terminates the processing. In the case where the power is turned on again, the robot system is normally started on the basis of the rewritten serial numbers and the rewritten offset values. The serial numbers (that is, the individual identification data) and the offset values (that is, the individual difference parameters) that are stored in the memory unit 22 of the robot controller 2 are rewritten by the serial numbers and the offset values that are read from the encoders 13 of the robot body 1 (and the aligner 4). Accordingly, in the case where the robot body 1 or the aligner 4, which is connected to the robot controller 2, has been replaced, the robot controller 2 is compatible with the robot body 1 or the aligner 4 after the replacement. In regard to the robot controller 2 as the spare part in which the initial values of the individual identification data (the serial numbers) and the individual difference parameters (the offset values) are stored in the memory unit 22, when the processing described herein is executed, such a robot controller 2 becomes suited for the control of the robot body 1 and the aligner 4 connected thereto.

Figure 5:
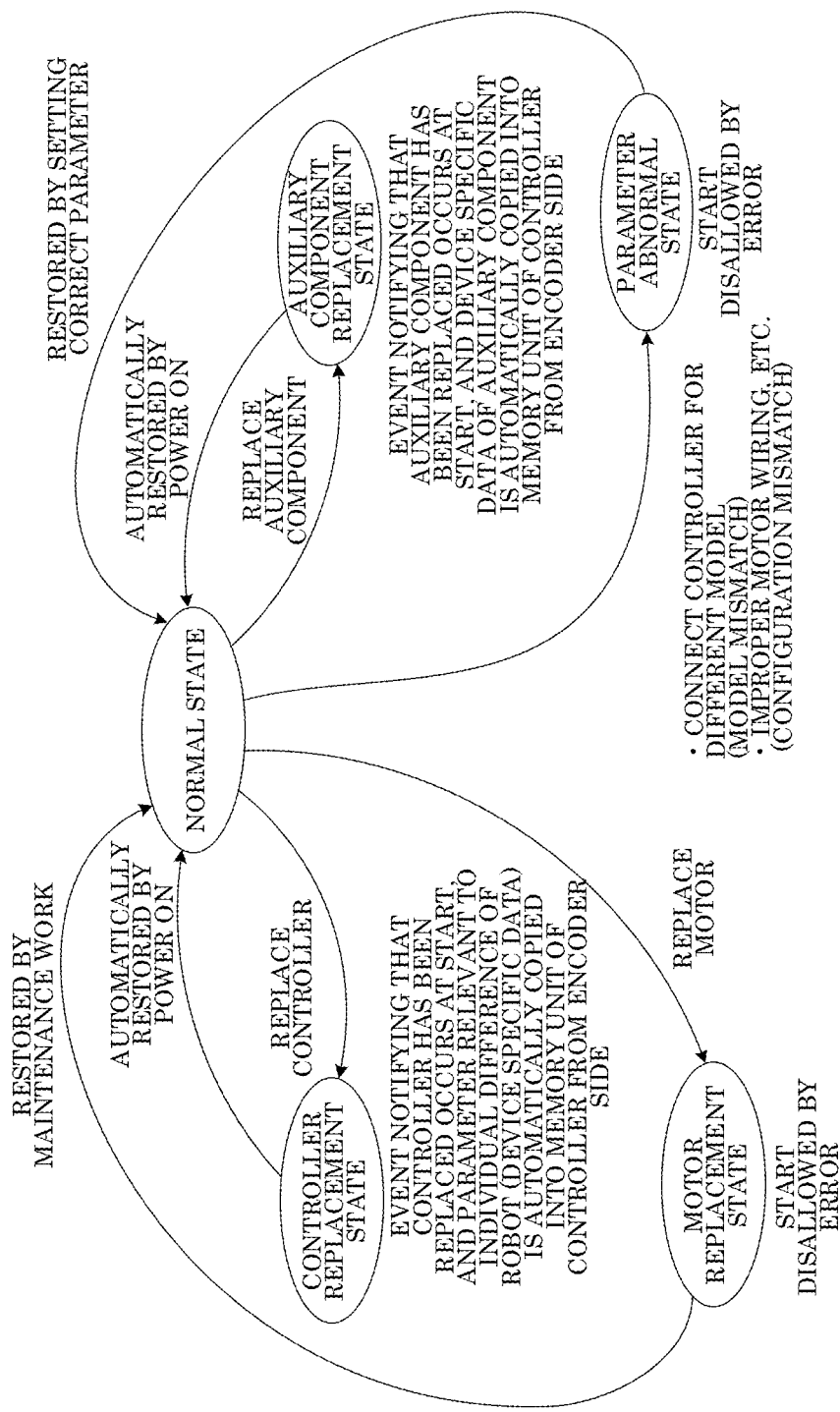
FIG. 5 is a state transition diagram of the operation of the robot system shown in FIG. 1.

FIG. 5 is a state transition diagram for illustrating the processing described herein. An appropriate state of the robot controller 2 for controlling the robot body 1 and the auxiliary component such as the aligner 4 connected thereto will be referred to as a normal state. In the case where the robot controller 2 is replaced in the normal state, an event indicating that the robot controller 2 has been replaced occurs at the start as shown in above step 118, the individual difference parameters are then automatically copied in the memory unit 22 of the robot controller 2 from the encoders 13 side, and the robot controller 2 returns to the normal state. Thereafter, when an operation to turn the power on is performed, the robot controller 2 is automatically restored in the normal state. Similarly, in the case where the auxiliary component such as the aligner 4 is replaced, an event indicating that the auxiliary component has been replaced occurs at the start as shown in above step 117, the individual difference parameter is automatically copied in the memory unit 22 of the robot controller 2 from the encoder 13 side, and the robot controller 2 returns to the normal state. Meanwhile, in the case where the motor 11 is replaced, as shown in step 103, the motor replacement error occurs. As a result, the processing to start the robot system is terminated abnormally, and the start of the robot system is disallowed. In order to restore the robot system from the motor replacement error to the normal state, maintenance work such as readjustment work of the shaft corresponding to the motor after the replacement has to be performed. Both of the model mismatch error determined in step 104 and the configuration mismatch error determined in step 105 are categorized as parameter abnormality in the device specific data that is saved in the robot body 1 or the aligner 4 and the robot controller 2. In the case where it is determined that the parameter abnormality is present, the processing to start the robot system is terminated abnormally, and the start of the robot system is disallowed. In order to restore the robot system from the parameter abnormality to the normal state, the correct parameter has to be set by using the robot controller 2 of the correct model, correcting improper wiring, or the like.

Effects of the Present Embodiment

According to the present embodiment, when the power is turned on or the like, the device specific data that is stored in the encoders 13 of the target robot (the robot body 1 and the aligner 4) is read and checked against the device specific data stored in the robot controller 2. In the case where the replacement of the robot controller 2 is detected, the latest individual difference parameters are read into the robot controller 2 from the target robot side. Thus, the robot controller 2 can be replaced with the robot controller 2 for the same model for use, and the robot controller 2 after the replacement can be used to execute the appropriate control of the target robot connected thereto. In addition, in the case where the mismatch of the models, the mismatch of the configurations, or the replacement of the motor 11 is detected, the start of the robot system is disallowed. In this way, the operations of the robot body 1 and the aligner 4 in inappropriate states can be prevented.

What is claimed is:

1. A robot system comprising:
 a robot controller; and
 a target robot as a target of control by the robot controller,
 wherein the target robot comprises plural drive shafts, each of the plural drive shafts comprises:
  a motor;
  an encoder that detects a rotary position of the motor; and
  a first memory unit provided in the encoder structured to store device specific data comprising:
   individual identification data used to identify said target robot; and
   an individual difference parameter unique to the encoder, wherein the robot controller comprises:
   a second memory unit structured to store the individual identification data and the individual difference parameter provided in the encoder of each of the plural drive shafts of the target robot connected to said robot controller; and
   a control unit structured to control the target robot on the basis of model configuration information common to a same model as the target robot and the individual difference parameter stored in the second memory unit, and
  wherein the control unit is structured to check the individual identification data and the individual difference parameter read from the first memory unit provided in the encoder of each of the plural drive shafts against the individual identification data and the individual difference parameter stored in the second memory unit and, in accordance with a checking result, update the individual difference parameter stored in the second memory unit with the individual difference parameter read from the first memory unit in a case that the individual difference parameter stored in the second memory unit does not match the individual difference parameter read from the first memory unit provided in the encoder of each of the plural drive shafts.

2. The robot system according to claim 1,
wherein the target robot comprises a robot body as a manipulator and an auxiliary component, and each of the robot body and the auxiliary component comprising at least one of the plural drive shafts comprising the first memory unit, and
wherein the control unit is structured such that, in the case where only an individual identification data of the auxiliary component read from the first memory unit differs from the individual identification data of the auxiliary component stored in the second memory unit, the control unit determines that the auxiliary component has been replaced, and updates only the individual difference parameter of the auxiliary component in the second memory unit.

3. The robot system according to claim 2, wherein the device specific data comprises information on the model of the target robot, and the control unit is structured such that, in the case where the information on the model in the device specific data does not match the model as the target of the robot controller, the control unit disallows a start of the robot system.

4. The robot system according to claim 3, wherein the device specific data comprises information on a configuration of the target robot, and the control unit is structured such that, in the case where the information on the configuration in the device specific data does not match a configuration of the target robot of the model as the target of the robot controller, the control unit disallows the start of the robot system.

5. The robot system according to claim 4, wherein the individual difference parameter is an offset value from a position of an origin.

6. The robot system according to claim 1, wherein the control unit is structured to detect replacement of the motor in the target robot on the basis of the device specific data, and, when detecting the replacement of the motor, disallow the start of the robot system.

7. The robot system according to claim 1, wherein the device specific data comprises information on the model of the target robot, and the control unit is structured such that, in the case where the information on the model in the device specific data does not match the model as the target of the robot controller, the control unit disallows a start of the robot system.

8. The robot system according to claim 1, wherein the device specific data comprises information on a configuration of the target robot, and the control unit is structured such that, in the case where the information on the configuration in the device specific data does not match a configuration of the target robot of the model as the target of the robot controller, the control unit disallows a start of the robot system.

9. The robot system according to claim 1, wherein the individual difference parameter is an offset value from a position of an origin.

10. A robot system comprising:
a robot controller; and
a target robot as a target of control by the robot controller,
wherein the target robot comprises plural drive shaft, each of the plural drive shafts comprises:
a motor;
an encoder that detects a rotary position of the motor; and
a first memory provided in the encoder structured to store device specific data comprising:
individual identification data used to identify said target robot; and
an individual difference parameter unique to the encoder, wherein the robot controller comprises:
a second memory structured to store the individual identification data and the individual difference parameter provided in the encoder of each of the plural drive shafts of the target robot connected to said robot controller; and
a controller structured to control the target robot on the basis of model configuration information common to a same model as the target robot and the individual difference parameter stored in the second memory, and
wherein the controller is structured to check the individual identification data and the individual difference parameter read from the first memory provided in the encoder of each of the plural drive shafts against the individual identification data and the individual difference parameter stored in the second memory and, in accordance with a checking result, update the individual difference parameter stored in the second memory with the individual difference parameter read from the first memory in a case that the individual difference parameter stored in the second memory unit does not match the individual difference parameter read from the first memory unit provided in the encoder of each of the plural drive shafts.

* * * * *